UNITED STATES PATENT OFFICE.

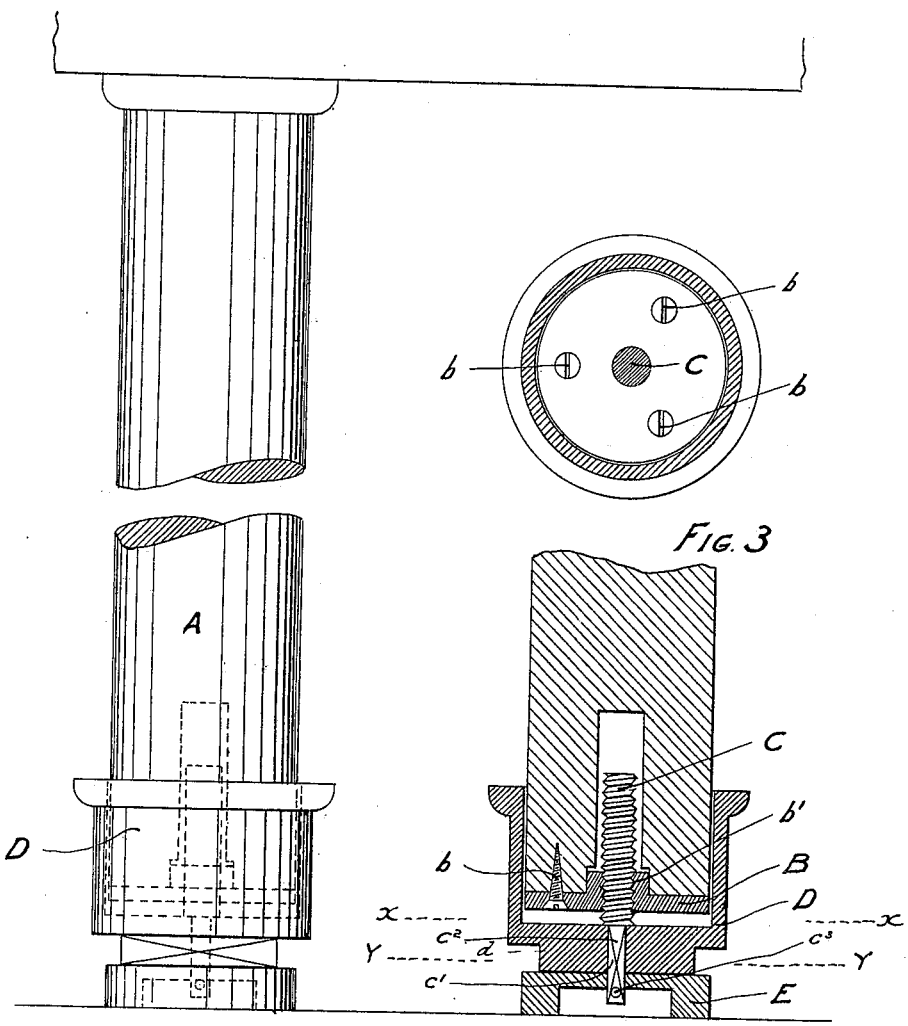

AMÉDÉE F. LAMOUREUX, OF MONTREAL, CANADA.

LEG FOR BILLIARD, POOL, OR OTHER TABLES.

SPECIFICATION forming part of Letters Patent No. 611,260, dated September 27, 1898.

Application filed September 13, 1897. Serial No. 651,505. (No model.)

*To all whom it may concern:*

Be it known that I, AMÉDÉE FRANÇOIS LAMOUREUX, a citizen of Canada, residing in the city and district of Montreal, in the Province of Quebec, Canada, have invented certain new and useful Improvements in Legs for Billiard, Pool, or other Tables; and I do hereby declare the following to be a full, clear, and exact description of the invention, such as will enable others skilled in the art to which it appertains to make and use the same.

My invention has reference to an arrangement allowing the length of billiard, pool, &c., tables to be adjustable, so that if they are placed on an uneven floor they can be almost instantly made perfectly level merely by lengthening or shortening the legs.

The object of my invention is to provide an easy and rapid method of leveling billiard, pool tables, &c.

Referring to the drawings, similar letters refer to similar parts throughout the several views.

Figure 1 is a general view of my device; Fig. 2, a vertical section; Fig. 3, a section on line $x\ x$ of Fig. 2, and Fig. 4 is a section on line $Y\ Y$ of Fig. 2.

A is the leg of a billiard, pool, or other table, to the bottom of which is secured the plate or nut B by means of screws $b$ and through the center of which there exists a threaded hole $b'$, into which is screwed a stud C, secured at $c'$ in the metallic cup or shield D, forming, as it were, the head of this stud C. The portion $c^2$ of the stud C is made square, so as not to turn in the nut D. However, it can be secured in any other suitable manner. This nut D rests onto the shoe or floor-plate E, which remains stationary on the floor, it being held in position by means of the portion $c^2$ of the stud C, which passes through it, and is provided with a cotter $c^3$ or its equivalent, on its under side.

The cup D is provided with a square portion $d$ on its under side, which rests on the plate E and which affords a means for revolving the said cup by the aid of a wrench.

The opening in the shoe or floor-plate E, in which passes the portion $c^2$ of the stud C, is made large enough to allow it to freely turn.

To operate my device, all there is necessary to do is to turn the stud C by means of the cup-shaped head D in such a way as to either lengthen or shorten the leg, as required, and thus get the surface of the table level.

Having described my invention, what I claim, and desire to secure by Letters Patent, is—

The combination, with a cylindrical table-leg, and a screw-threaded plate secured to its bottom end; of a thrust-plate resting on the floor and provided with a recess in its under side, a revoluble cylindrical cup encircling the said leg and having a nut portion $d$ formed integral with its bottom and which rests on the said thrust-plate, a screw engaging with the said screw-threaded plate and provided with a shank which is secured in the nut portion of the said cup and which is revoluble in the said thrust-plate, and a pin passed through the said shank in the said recess of the thrust-plate, substantially as set forth.

In testimony whereof I have affixed my signature in presence of two witnesses.

AMÉDÉE F. LAMOUREUX.

Witnesses:
ALPH. WALTER,
EDG. FISET.